US005198284A

United States Patent [19]

Kitamura et al.

[11] Patent Number: 5,198,284

[45] Date of Patent: Mar. 30, 1993

[54] THERMAL TRANSFER RECORDING MEDIUM

[75] Inventors: Shigehiro Kitamura, Hachioji; Hiroshi Watanabe; Masataka Takimoto, both of Hino; Athushi Nakajima, Hachioji, all of Japan

[73] Assignee: Konica Corporation, Tokyo, Japan

[21] Appl. No.: 676,520

[22] Filed: Mar. 28, 1991

[30] Foreign Application Priority Data

Apr. 3, 1990 [JP] Japan .................................... 2-88908
Apr. 3, 1990 [JP] Japan .................................... 2-88909

[51] Int. Cl.[5] .............................................. B32B 9/00

[52] U.S. Cl. ................................ 428/195; 428/488.4; 428/522; 428/913; 428/914

[58] Field of Search ............... 428/195, 284, 207, 253, 428/212, 484, 913, 914, 522

[56] References Cited

U.S. PATENT DOCUMENTS 4,978,580 12/1992 Tezuka et al. ...................... 428/195

*Primary Examiner*—Patrick J. Ryan
*Assistant Examiner*—W. Krynski
*Attorney, Agent, or Firm*—Finnegan, Henderson, Farabow, Garrett & Dunner

[57] ABSTRACT

There is disclosed the thermal transfer recording medium capable of providing high quality printed images even on a lower smoothness paper at a high speed without producing voids. The recording medium comprises a support and provided thereon a thermosoftening layer, wherein at least one of the thermosoftening layers is provided on the support via an another layer and contains a binder comprising an olefin resin, a polyurethane resin, and at least one of an acrylic resin and a polyester resin.

12 Claims, No Drawings

THERMAL TRANSFER RECORDING MEDIUM

FIELD OF THE INVENTION

This invention relates to a thermal transfer recording medium, particularly to a thermal transfer recording medium having an excellent fixing property without producing any voids and capable of speedily forming a high quality printed image with a high density and an excellent dot reproducibility even on a recording member having a low smoothness at a higher speed.

BACKGROUND OF THE INVENTION

The recording members on which images are printed with a thermal transfer recording medium are a smooth paper prepared especially for thermal transfer, PPC, a rough paper such as a bond paper, and an OHP sheet.

There are available conventional thermal transfer recording media capable of printing images with improved qualities and fixing properties on the above individual recording members of various types but, no recording media have so far been available which can print images with excellent qualities and fixing properties on any types of the recording members.

For example, conventional ink ribbon type thermal transfer recording media can provide good printed images on a smooth paper, while providing poor images on PPC and an OHP sheet, particularly inferior images on a rough paper.

There are proposed some thermal transfer recording media capable of providing high quality images on a rough paper, while they have another problem that dot reproducibility on a smooth paper and an OHP sheet is inferior.

SUMMARY OF THE INVENTION

It is an object of the present invention to provide a thermal transfer recording medium capable of providing a high quality printed image having an excellent fixing property and a high density without producing any voids even on recording members with low smoothness such as PPC, a rough paper and an OHP sheet as well as on a high smooth paper.

Another object of the invention is to provide a thermal transfer recording medium capable of providing a high quality image even at a high printing speed.

The above objects of the invention can be achieved by the thermal transfer recording medium comprising a support and provided thereon a thermosoftening layer, wherein at least one of the thermosoftening layers is provided on the support via an another layer and contains an olefin resin, a polyurethane resin and at least one of an acrylic resin and a polyester resin.

DETAILED DESCRIPTION OF THE INVENTION

Thermosoftening Layer

The thermosoftening layer provided on the support may be either of a single layer type or multilayer type. The multilayer preferably comprises two layers, an upper layer and a lower layer. Where the thermosoftening layer is of a single layer type, it is provided on a support via a peeling layer or an anchor layer.

It is important in the invention that a thermosoftening layer provided on a support via a different layer contains an olefin resin, a polyurethane resin and at least one of an acrylic resin and a polyester resin as the essential components.

The examples of the olefin resin are ethylene-vinyl acetate copolymer, ethylene-ethyl acryalate copolymer, ethylene-ethyl acrylate-maleic anhydride copolymer, ethylene-vinyl acetate-maleic anhydride copolymer, ethylene-acrylic acid copolymer, ethylene-methacrylic acid copolymer, polyethylene oxide, and ethylene-α olefin copolymer.

Among the above olefin resins, the ethylenic copolymers such as ethylene-vinyl acetate, ethylene-ethyl acrylate and ethylene-ethyl acrylate-maleic anhydride copolymers are preferably used.

The ethylenic copolymers have preferably the ethylene content of less than 72 wt %, more preferably less than 65 wt %.

The olefin resins may be used singly or in combination.

The examples of the acrylic resins are polyethyl methacrylate, polybutyl methacrylate, styrene-butyl acrylate copolymer, and butyl methacrylate-ethyl methacrylate copolymer.

The acrylic resins preferably have the molecular weight of not less than 150,000, more preferably not less than 200,000.

The acrylic resins may be used singly or in combination.

The polyester resins can be prepared by condensation polymerization of diols and dicarboxylic acids or by ring-opening polymerization of γ-caprolactone. The examples of the diols are ethylene glycol, propylene glycol, diethylene glycol, neopentyl glycol, polyethylene glycol, 1,4-butane diol, hexanediol, and bisphenol A. The examples of the dicarboxylic acids are adipic acid, azelaic acid, sebacic acid, maleic acid, isophthalic acid, and terephthalic acid.

The polyester resins may be used singly or in combination.

In the invention, at least one of the acrylic resin and the polyester resin is incorporated into the thermosoftening layer.

Generally, two types of the polyurethane resins are available; one is prepared from polyester polyol and diisocyanate, and the other from polyether polyol and diisocyanate. In the invention, preferred is the linear polyurethane resin prepared from polyester polyol and diisocyanate.

The polyester polyols for the above linear polyurethane resin can be prepared by condensation polymerization of diols and dicarboxylic acids. The examples of the diols are ethylene glycol, propylene glycol, butane diol, hexanediol, neopentyl glycol, diethylene glycol, dipropylene glycol, polyethylene glycol, and bisphenol A and derivative thereof. The examples of the dicarboxylic acids are adipic acid, azelaic acid, sebacic acid, maleic acid, phthalic acid, isophthalic acid, and terephthalic acid.

The examples of the diisocyanates used for the above linear polyurethane resin are tolylene diisocynate, 4,4'-diphenylmethane diisocyanate, xylene diisocyanate, hexamethylene diisocyanate, 4,4'-methylene-bis(cyclohexyl isocyanate), and naphthylene diisocyanate.

The examples of the polyether polyols are polyethylene glycol and polypropylene glycol.

The ratios of the components constituting the linear polyurethane resin related to the invention are 1 to 30 mol %, preferably 3 to 25 mol % for diisocyanate, 30 to 60 mol %, preferably 35 to 55 mol % for diol, and 20 to 60 mol %, preferably 25 to 55 mol % for dicarboxylic acid.

The above linear polyurethane resin has the weight-average molecular weight of 10,000 to 100,000, preferably 15,000 to 80,000.

The glass transition point thereof ranges from −60° to 0° C., preferably −50° to 0° C., and the softening point ranges from 20° to 120° C., preferably 30° to 100° C.

The respective amounts of the above resins incorporated into the thermosoftening layer are 5 to 50 wt %, preferably 10 to 40 wt % for the olefin resin, 1 to 50 wt %, preferably 5 to 40 wt % for the acryl resin and/or polyester resin, and 0.1 to 30 wt %, preferably 0.2 to 20 wt % for the polyurethane resin, each based on the total amount of the above resins.

The other resins usable in combination with the above resins are rosin-modified resin, terpene resin, petroleum resin, styrene resin, styrene-acryl resin, ketone resin, maleic acid-modified resin, phenol resin, and terpene-phenol resin.

The softening point thereof is 50° to 150° C., preferably 70° to 125° C.

In the invention, the thermosoftening layer containing the resins related to the invention may or may not contain a colorant but, preferably contains it.

Where the thermosoftening layer containing the above resins contains a colorant, the other thermosoftening layers may not necessarily contain the colorant. Where no colorant is contained therein, the colorant is incorporated preferably into at least one of the other layers.

The colorants are inorganic and organic pigments and dyes.

The examples of the inorganic pigments are titanium dioxide, carbon black, zinc oxide, Prussian blue, cadmium sulfide, iron oxide, and chromates of lead, zinc, barium and calcium.

The examples of the organic pigments are the pigments of azo type, thioindigo type, anthraquinone type, anthanthrone type, and triphenedioxanzine type; vat-dye pigments; phthalocyanine pigments such as copper phthalocyanine and the derivatives thereof; and quinacridone pigments.

The examples of the dyes are acidic dye, direct dye, disperse dye, oil-soluble dye, and metal-containing oil-soluble dye.

The proportion of the colorant added to the thermosoftening layers is 1 to 30 wt %, preferably 5 to 25 wt %.

The thermosoftening layers other than the layer containing the resins related to the invention may be provided directly on the support or on the opposite side of the support.

The thermosoftening layer adjacent to the support may contain a fusible material and a thermoplastic resin in addition to the colorant.

The examples of the fusible materials are vegetable waxes such as carnauba wax, Japan wax, ouricury wax, and esparto wax; animal waxes such as bees wax, insect wax, shellac wax, and spermaceti; petroleum waxes such as paraffin wax, microcrystal wax, polyethylene wax, ester wax, and oxidation wax; and mineral waxes such as montan wax, ozokerite, and ceresin. In addition to the above waxes, there can be used as the fusible materials higher fatty acids such as palmitic acid, stearic acid, margaric acid, and behenic acid; higher alcohols such as palmityl alcohol, stearyl alcohol, behenyl alcohol, margaryl alcohol, myricyl alcohol, and eicosanol; higher fatty acid esters such as cetyl palmitate, myricyl palmitate, cetyl stearate, and myricyl stearate; amides such as acetamide, propionic amide, palmitic amide, stearic amide, and amide wax; and higher amines such as stearyl amine, behenyl amine, and palmityl amine.

Low molecular weight polymers can also be used as the fusible materials. The examples thereof are polystyrene, styrene-acrylic acid copolymers, polyester, rosin derivatives, petroleum resins, and ketone resins.

The waxes and low molecular weight polymers may be used singly or in combination.

The above fusible materials have preferably the melting point of 50° to 100° C.

The content of the fusible material is 10 to 90 wt %, preferably 20 to 80 wt %.

The above thermoplastic resins are exemplified by the foregoing olefin resins.

The content of the thermoplastic resin is 1 to 40 wt %, preferably 3 to 20 wt % and, more preferably 5 to 15 wt %.

Further, the thermosoftening layers may contain a surfactant, inorganic or organic fine particles such as metal powder and silica gel, and oil such as linseed oil and mineral oil.

Support

In the invention, the supports preferably have an excellent heat resistance and a high dimensional stability.

The raw materials of the supports are paper such as plain paper, condenser paper, laminated paper and coated paper; a resin film made of polyethylene, polyethylene terephthalate, polystyrene, polypropylene and polyimide; a composite material of paper and a resin film; and a metal sheet.

The thickness of the support is 30 μm or less, preferably 2 to 30 μm. The thickness exceeding 30 μm is liable to deteriorate thermal conductivity, which results in a lower printed image quality.

A backing layer may be provided on the back of the support.

Thermal Transfer Recording Medium

The thermosoftening layers can be coated on a support by hot-melt coating, aqueous coating or organic solvent coating.

In the thermosoftening layer consisting of the two layers, the thickness of the lower layer is 0.3 to 8.0 μm, preferably 0.5 to 6.0 μm, and that of the upper layer is 0.3 to 2.5 μm, preferably 0.5 to 2.0 μm.

There may be provided an interlayer between the above thermosoftening layers.

After coating each of the layers on the support, the resulting recording medium is subjected to drying and surface smoothing treatments and cut to a prescribed form such as a tape and a sheet, whereby the thermal transfer recording medium of the invention is prepared.

EXAMPLES

The invention is detailed with reference to the following examples and comparisons.

Example 1

The following components for the lower layer were coated on a 3.5 μm thick polyethylene terephthalate film to the dry thickness of 2.0 μm to thereby form the lower layer.

The coating was carried out by the hot melt method with a wire bar.

| Composition for the lower layer | |
|---|---|
| Paraffin wax | 70 wt % |
| Ethylene-vinyl acetate copolymer | 10 wt % |
| Carbon black | 15 wt % |
| Dispersant | 5 wt % |

Next, the following components for the upper layer, which were dispersed in methyl ethyl ketone, were coated on the lower layer to the dry thickness of 1.0 μm to form the upper layer, whereby the thermal transfer recording medium of the invention was prepared.

The coating was carried out with a wire bar.

| Composition for the upper layer | |
|---|---|
| Ethylene-vinyl acetate copolymer [Ethylene/vinyl acetate = 59/41, MI: 65] | 20 wt % |
| Acrylic resin [Polypropyl methacrylate, MW: 190,000, Tg: 35° C.] | 10 wt % |
| Linear polyurethane resin 4,4'-diphenylmethane diisocyanate/neopentyl glycol/1,4-butane diol/adipic acid = 22/13/37/28, Tg: −20° C., Mw: 33,000] | 5 wt % |
| Alkyl phenol resin [Sp 80° C.] | 50 wt % |
| Carbon black | 15 wt % |

Example 2

The thermal transfer recording medium of the invention was prepared in the same manner as in Example 1, except that the components for the upper layer were replaced by the following ones.

| Composition for the upper layer | |
|---|---|
| Ethylene-vinyl acetate copolymer [Ethylene/vinyl acetate = 44/46] | 10 wt % |
| Polyester resin [Neopentyl glycol/cyclohexyl dimethanol/phthalic acid; Tg: 67° C., Mw: 20,000] | 20 wt % |
| Linear polyurethane resin [4,4'-diphenylmethane diisocyanate/1,4-butane diol/adipic acid = 14/49/37; Tg: −7.5° C., Mw: 39,000] | 3 wt % |
| Rosin-modified glycerol ester [Sp: 78° C.] | 47 wt % |
| Carbon black | 20 wt % |

Example 3

The thermal transfer recording medium of the invention was prepared in the same manner as in Example 1, except that the components for the upper layer were replaced by the following ones.

| Composition for the upper layer | |
|---|---|
| Ethylene-ethyl acrylate copolymer [Ethylene/ethyl acrylate = 65/35, MI: 25] | 20 wt % |
| Polybutyl methacrylate copolymer [Tg: 60° C., Mw: 35,000] | 30 wt % |
| Linear polyurethane resin [Tolylene diisocyanate/ethylene glycol/adipic acid = 5.5/49/45.5; Tg: −15° C., Mw: 35,000] | 10 wt % |
| Carnauba wax [Mp: 87° C.] | 20 wt % |
| Ketone resin [Sp: 90° C.] | 20 wt % |

Example 4

The thermal transfer recording medium of the invention was prepared in the same manner as in Example 1, except that the components for the upper layer were replaced by the following ones.

| Composition for the upper layer | |
|---|---|
| Ethylene-ethyl acrylate-maleic anhydride copolymer [Ethylene/ethyl acrylate/maleic anhydride = 69/29/2; MI: 7] | 10 wt % |
| Acrylic resin [Ethyl acrylate/methyl methacrylate/methacrylic acid; Tg: 35° C., Mw: 70,000] | 20 wt % |
| Polyester resin [Neopentyl glycol/cyclohexyl dimethanol/polycaprolactone/phthalic acid; Tg: 20° C., Mw: 35,000] | 10 wt % |
| Polymethyl siloxane-modified urethane resin [Sp: 100° C., Mw: 46,000] | 5 wt % |
| Rosin-modified maleic acid resin [SP: 100° C.] | 40 wt % |
| Carbon black | 15 wt % |

Example 5

The thermal transfer recording medium of the invention was prepared in the same manner as in Example 1, except that the components for the upper layer were replaced by the following ones.

| Composition for the upper layer | |
|---|---|
| Ethylene-vinyl acetate copolymer [Ethylene/vinyl acetate = 30/70; MI: 45] | 20 wt % |
| Polybutyl methacrylate Tg: 20° C.; Mw: 360,000] | 10 wt % |
| Linear polyurethane resin Tolylene diisocyanate/1,4-butane diol/adipic acid = 5/50/45; Tg: −28° C., Mw: 35,000] | 2 wt % |
| Rosin-modified synthetic resin [Sp: 100° C.] | 43 wt % |
| Carbon black | 25 wt % |

Comparison 1

The comparative thermal transfer recording medium was prepared in the same manner as in Example 1, except that the components for the upper layer were replaced by the following ones.

| Composition for the upper layer | |
|---|---|
| Polypropyl methacrylate [Mw: 190,000; Tg = 35° C.] | 20 wt % |
| Linear polyurethane resin [Tolylene diisocyanate/ethylene glycol/adipic acid = 5.5/49/45.5; Tg: −15° C., Mw: 35,000] | 10 wt % |
| Alkyl phenol resin [Sp: 80° C.] | 50 wt % |
| Carbon black | 20 wt % |

Comparison 2

The comparative thermal transfer recording medium was prepared in the same manner as in Example 1, except that the components for the upper layer were replaced by the following ones.

| Composition for the upper layer | |
|---|---|
| Ethylene-vinyl acetate copolymer [Ethylene/vinyl acetate = 44/46; MI: 95] | 10 wt % |
| Linear polyurethane resin [4,4'-diphenylmethane diisocyanate/1,4-butane diol/adipic acid = 14/49/37; Tg: −7.5° C., Mw: 39,000] | 20 wt % |
| Alkyl phenol resin [Sp: 80° C.] | 70 wt % |

Comparison 3

The comparative thermal transfer recording medium was prepared in the same manner as in Example 1, except that the components for the upper layer were replaced by the following ones.

| Composition for the upper layer | |
|---|---|
| Ethylene-ethyl acrylate copolymer [Ethylene/ethyl acrylate = 65/35; MI: 25] | 20 wt % |
| Polyethylene terephthalate resin [Tg: 67° C.] | 20 wt % |
| Alkyl phenol resin [Sp: 80° C.] | 40 wt % |
| Carbon black | 20 wt % |

Comparison 4

The comparative thermal transfer recording medium was prepared in the same manner as in Example 1, except that the lower layer was removed.

Evaluation

Each of the above thermal transfer recording media was loaded on a commercially available printer with a 24-dot serial head and an applied energy of 30 mJ/head, and was subjected to a printing test of alphabetical characters and 2-dot lines on a copy paper and a Lancaster paper (a Beck's smoothness: 2 seconds) to evaluate the high speed printing property on a rough paper in the following manner:

The printing was carried out with a platen pressure of the printer adjusted to 300 g/head at the printing speeds as shown in Table 1. The qualities of the printed images were visually observed and classified to the following three grades:

| | |
|---|---|
| Character | |
| ○ | Excellent sharpness without voids and blurs. |
| Δ | Some voids observed. |
| X | Many voids observed on illegible letters. |
| Line | |
| ○ | Excellent printing without blurs and breaks. |
| Δ | Some blurs and breaks observed. |
| X | Inferior printing with no practicability. |

The results are shown in Table 1.

TABLE 1

| | Printing speed (cps) | | | | | | | |
|---|---|---|---|---|---|---|---|---|
| | 20 | | | | 30 | | | |
| | Copy paper | | Lancaster paper | | Copy paper | | Lancaster paper | |
| | Character | Line | Character | Line | Character | Line | Character | Line |
| Example 1 | ○ | ○ | ○ | ○ | ○ | ○ | ○ | ○ |
| Example 2 | ○ | ○ | ○ | ○ | ○ | ○ | ○ | ○ |
| Example 3 | ○ | ○ | ○ | ○ | ○ | ○ | ○ | ○ |
| Example 4 | ○ | ○ | ○ | ○ | ○ | ○ | ○ | ○ |
| Example 5 | ○ | ○ | ○ | ○ | ○ | ○ | ○ | ○ |
| Comparison 1 | ○ | Δ | ○ | Δ | ○ | Δ | ○ | X |
| Comparison 2 | ○ | Δ | ○ | Δ | ○ | Δ | ○ | X |
| Comparison 3 | ○ | ○ | Δ | ○ | Δ | ○ | X | Δ |
| Comparison 4 | X | X | X | X | X | X | X | X |

As is obvious from Table 1, the thermal transfer recording media of the invention have the excellent fixing properties even in a high speed printing on a variety of recording members without deteriorating the print quality.

Further, the recording media of the invention can provide the images with a high density and no voids even on a recording member having a smoothness as low as 1 to 2 seconds in terms of the Beck's smoothness.

What is claimed is:

1. A thermal transfer recording medium comprising a support, provided thereon a thermosoftening layer, an intermediate layer interposed between the support and the thermosoftening layers, and a colorant in at least one of the thermosoftening or intermediate layers, wherein the thermosoftening layer contains a binder comprising an olefin resin, a polyurethane resin, and at least one of an acrylic resin and a polyester resin.

2. The recording medium of claim 1, wherein the polyurethane resin is a linear polyurethane resin prepared from diisocyanate, diol and dicarboxylic acid.

3. The recording medium of claim 2, wherein the proportions of the components constituting the linear polyurethane resin are 1 to 30 mol % for diisocyanate, 30 to 60 mol % for diol, and 20 to 60 mol % for dicarboxylic acid.

4. The recording medium of claim 2, wherein the molecular weight of the linear polyurethane resin is 10,000 to 100,000.

5. The recording medium of claim 4, wherein the molecular weight is 15,000 to 80,000.

6. The recording medium of claim 2, wherein the glass transition point and softening point of the resin are −60° to 0° C. and 20° to 120° C., respectively.

7. The recording medium of claim 1, wherein the olefin resin is an ethylenic copolymer having an ethylene content of less than 72% by weight.

8. The recording medium of claim 1, wherein the acrylic resin has a molecular weight of not less than 150,000.

9. The recording medium of claim 1, wherein the proportions of said resins are 5 to 50% by weight for the olefin resin, 0.1 to 30% by weight for the urethane resin, and 1 to 50% by weight for at least one of the acrylic resin and the polyester resin, based on the total amount of the resins.

10. The recording medium of claim 9, wherein the proportions are 10 to 40% by weight, 0.2 to 20% by weight, and 5 to 40% by weight, respectively.

11. The recording medium of claim 1, wherein the thermosoftening layer comprises a lower layer and an upper layer, said upper layer containing said resins in combination.

12. The recording medium of claim 11, wherein at least one of the lower layer and the upper layer contains a colorant.

* * * * *